United States Patent [19]

Connolly

[11] 3,953,305

[45] Apr. 27, 1976

[54] CATALYST REGENERATION

[75] Inventor: John F. Connolly, Wheaton, Ill.

[73] Assignee: Standard Oil Company, Chicago, Ill.

[22] Filed: Jan. 17, 1975

[21] Appl. No.: 541,801

[52] U.S. Cl.................................. 204/97; 204/78; 204/79; 204/80; 260/617 H
[51] Int. Cl.² ...................... C25B 1/00; C25B 3/02
[58] Field of Search .................... 204/97, 78–80; 260/617

[56] References Cited
UNITED STATES PATENTS 3,397,226  8/1968  Fenton .................................. 204/80
3,650,918  3/1972  Johnson et al. ....................... 204/80

*Primary Examiner*—R. L. Andrews
*Attorney, Agent, or Firm*—William H. Magidson; Arthur G. Gilkes; William T. McClain

[57] ABSTRACT

Production of glycols by oxidizing an olefinic compound in an aqueous acidic medium comprising source of catalytically active osmium tetroxide, chemically regenerating osmium tetroxide by oxidizing hexavalent osmium with hexavalent chromium and electrochemically regenerating hexavalent chromium from lower valent chromium.

11 Claims, No Drawings

CATALYST REGENERATION

This invention relates to chemical oxidation of olefinic compounds and indirect electrochemical catalyst regeneration.

Osmium tetroxide has been used as a catalyst in the electrochemical oxidation of olefins to glycols, particularly propylene to proylene glycol. In this reaction the octavalent osmium is reduced to the hexavalent state, Usually $OsO_4^=$. It has been suggested that the hexavalent osmium can be oxidized back to the octavalent state chemically by adding hydrogen peroxide [J. Chem. Soc. 2988 (1948)], or electrochemically by use of a ferro-ferri cyanide couple in basic solutions [IEC Products Res., 7, 129 (1968)]. The relatively high cost of hydrogen peroxide tends to make chemical regeneration of octavalent osmium uneconomic on a large scale while the low cell concentration of glycol attainable in basic mediums is economically unattractive. Accordingly, there is a need for other techniques for regenerating osmium tetroxide.

U.S. Pat. No. 3,650,918 discloses the electrochemical oxidation of olefinic materials to aldehydes, ketones and carboxylic acids using as catalysts Group VIII metals, oxides of Group VIII metals and inorganic salt compounds containing a Group VIII metal. Although the patentees indicate that their invention resides in providing methods of regenerating the Group VIII metal catalysts, the only catalyst regenerating agents disclosed are iodic acid, periodic acid, a mixture of iodic acid and periodic acid or its equivalent such as a mixture of sulfuric acid and sodium iodate.

The general object of this invention is to provide a method of oxidizing olefinic materials using a new catalyst regeneration system. A more specific object of this invention is to provide a method of oxidizing olefinic material to glycols using a new catalyst regeneration system suitable for converting hexavalent osmium catalyst to the octavalent state. Other objects appear hereinafter.

The objects of this invention can be attained by (1) oxidizing olefinic compounds to glycols in an aqueous acidic medium comprising a source of catalytically active osmium tetroxide, (2) chemically regenerating osmium tetroxide by chemically oxidizing hexavalent osmium with hexavalent chromium and (3) electrochemically regenerating hexavalent chromium from lower valent chromium. As explained below, all of the steps can be carried out in an electrochemical cell. For convenience the chemical reactions using propylene as the olefin may be viewed as follows:

I Formation of glycol

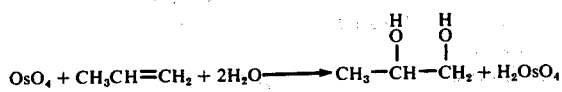

II Regeneration of osmium

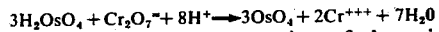

III Electrochemical regeneration of chromium
Anode:

Cathode:

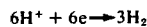

As indicated above, the hexavalent osmium is converted chemically to the catalytically active octavalent state by hexavalent chromium ($Cr_2O_7^=$). Various studies by me have shown that the regeneration of the active octavalent osmium is not directly dependent upon the electrochemical reactions since the octavalent osmium can be regenerated by adding dichromate to hexavalent osmium ($OsO_4^=$). It is the electrochemical regeneration of hexavalent chromium ($Cr_2O_7^=$) from lower valent chromium that necessitates the use of an electrochemical cell and forms the basis for the indirect regeneration of osmium tetroxide catalyst. Permanganates can not be used in place of the dichromates.

While virtually any olefinically unsaturated compound, such as those described in U.S. Pat. No. 3,650,918, which is incorporated by reference, can be utilized in this invention, olefins and polyolefins containing 2 to 4 carbon atoms, such as ethylene, propylene, butylene, butadiene, etc., are preferred. Generally the olefinically unsaturated compound is charged to the anolyte and maintained in the head space of the cell.

The osmium oxidation catalyst can be utilized in either the octavalent catalytically active state (e.g. osmium tetroxide) or in the hexavalent state (e.g. as an $OsO_4^=$ ion.) In the latter case the $OsO_4^=$ is converted to the catalytically active octavalent state by hexavalent chromium. Since octavalent osmium is continuously chemically regenerated, there is little need to add additional osmium to the system. The osmium compound can be utilized in catalytic amounts, e.g. .01 to 1% by weight of the composition in the anolyte.

Chromium in any of its valence states (0, +2, +3 or +6) can constitute the source of hexavalent chromium in this invention. For example, chromium plated anodes or stainless steel anodes can be used. Chromous or chromic salts (e.g. sulfate, acetate, etc.) or water-soluble alkali metal (sodium or potassium) dichromates, etc. can be used. If the chromium added to the system has a valence less than +6, it is electrochemically converted to the +6 valence. Since hexavalent chromium is continuously electrochemically regenerated, there is little need to add additional chromium to the system.

The electrochemical cell must be maintained acidic in order to obtain the desired regenerations and optimum concentrations of glycols in the aqueous medium. The pH during hexavalent chromium regeneration can be maintained at about 1.3 to 3 with water-soluble acids, such as sulfuric acid, trifluoroacetic acid, trichloroacetic acid, mixtures of strong acids (sulfuric acid) and relatively weak organic acids such as acetic acid, propionic acid, etc. The acids must be water-soluble since water is the preferred reaction solvent. Best results have been obtained when an organic acid capable of forming a peracid constitutes at least part of the acids in the system. For example, the maximum current efficiency attained in conversion of propylene to propylene glycol using sulfuric acid as the sole acidic component was 30% while 50 to 60% current efficiency was attained regularly with strong organic acids capable of forming a peracid or mixture of weak organic acids capable of forming peracid and sulfuric acid.

Suitable electrolyte salts include the alkali metal salts of strong acids, such as sodium sulfate, potassium sulfate, sodium fluoroborate, sodium trifluoroacetic acid, potassium trichloroacetic acid, etc.

As indicated above, in the practice of this invention either the anode or anolyte provides a source of chromium (e.g. chrome plated electrode, stainless steel, etc. or the chromium is in a salt form in the anolyte). If the chromium is provided in the salt form, the anode can be a chrome plated electrode or virtually any metal that can be passivated or is not dissolved by the electrolyte at high potentials such as lead, platinum or gold. The cathode can be any metal not attacked by the electrolyte at negative potentials such as platinum, gold or iron. Best results have been attained using a divider to prevent chromium salts from being reduced to chromium metal at the cathode.

In general, an impressed current density in the range from about 10 to about 500 amps/Ft.$^2$, and preferably from about 50 to 300 amps./Ft.$^2$, can be employed.

Electrolysis temperature is not a critical variable and the reaction can readily be conducted within the range from 40 to 150°F. Generally, the preferred olefins and polyolefins are maintained under pressure in a sealed cell to increase solubility in the liquid phase. During electrolysis part of the solution may be continuously removed from the cell, passed through a cooling coil and returned to the cell.

When the concentration of glycol reaches the desired level, the cell contents (anolyte) can be transferred to a still and heated to recover glycol and any olefinic material before returning the reactants to the electrolysis cell.

Although this invention can be carried out in an electrochemical cell, it is within the scope of this invention to carry out the oxidation of olefinic material in one reactor and cycle the aqueous reaction medium containing hexavalent osmium or lower valent chromium to the electrochemical cell for regeneration to octavalent osmium and/or hexavalent chromium. The reactants can then be recycled to the main reactor.

The following examples are merely illustrative.

EXAMPLE I

A 1 inch i.d. vertical electrolytic cell was fitted at the bottom with a chrome plated steel foil anode having a 4 cm$^2$ exposed area, backed by a stainless steel plate. A platinum wire cathode was positioned one-half inch above the anode with a ⅞ × ⅝ inch glass covered magnetic stirrer and glass frit "medium" porosity separator positioned between the electrodes. Sheathed wires connected the electrodes to a D.C. power source. The two electrodes were immersed in an aqueous pH 1.7 solution containing 11% by weight sodium sulfate, 2% by weight trifluoroacetic acid and 0.4% by weight osmium tetroxide (approximately 14 grams solution). The top of the sealed cell was equipped with a propylene inlet through which 100 psi propylene at 40°C. was added. After the composition was electrolyzed at 50 A/ft$^2$ at 4 to 9 volts for one hour, the anolyte was neutralized with aqueous sodium hydroxide and analyzed by gas chromatography. Analysis indicated 100% selectivity in conversion to propylene glycol at a current efficiency of 60%, i.e. the reaction medium contained 1.6% by weight propylene glycol.

When this example was repeated in the absence of propylene, the solution took on the characteristic orange-yellow dichromate color, thereby indicating that dichromate is formed during electrolysis. When sodium dichromate was added to aqueous mixtures of propylene and osmium tetraoxide, without electrolyzing, propylene glycol was formed.

The current efficiency was 0% when the chromium anode was replaced with the following anodes: (A) gold, (b) palladium, (C) carbon, (D) vanadium, (E) nickel, (F) tin, (G) cobalt, (H) lead, (I) tantalum, (J) titanium, (K) zirconium and (L) molybdenum. The current efficiency was 5% when the chromium anode was replaced with a platinum anode.

EXAMPLE II

This example illustrates that the source of hexavalent chromium can be trivalent chromium. Example I was repeated using a lead anode in place of the chromium anode and the anolyte contained 6% by weight chromium sulfate in addition to the other components of the anolyte in Example I. Current efficiency was 55% and there was 100% selectivity in conversion to propylene glycol.

EXAMPLE III

Example II was repeated replacing the trifluoroacetic acid with 4% by weight acetic acid and sufficient sulfuric acid to adjust the pH to 1.7. Current efficiency was 50% and there was 100% selectivity.

EXAMPLE IV

Example I was repeated replacing the 11% by weight sodium sulfate electrolyte with (A) 22% by weight sodium sulfate, (B) 5% by weight sodium sulfate and (C) 11% by weight NaBF$_4$ yielding current efficiencies of (A) 15%, (B) 50% and (C) 60% and 100% selectivity in all cases.

EXAMPLE V

When Example I was repeated replacing the trifluoroacetic acid with the same concentration trichloroacetic acid the same results were obtained.

EXAMPLE VI

The same results were obtained when Example I was repeated using an aqueous pH 1.7 anolyte comprising 12% by weight NaBF$_4$, .05% by weight trifluoroacetic acid and 0.5% by weight osmium tetraoxide at 50 A/ft$^2$ at 5 volts.

EXAMPLE VII

When Example VI was repeated using an aqueous pH 1.7 anolyte comprising 12% by weight Na$_2$SO$_4$, 2% trifluoroacetic acid and 0.5% by weight osmium tetroxide current efficiency was reduced from 60% to 50%.

When the trifluoroacetic acid in this example was replaced with sufficient sulfuric acid to adjust the pH to 1.7, the current efficiency was reduced to 30%.

EXAMPLE VIII

When Example I is repeated using ethylene in place of propylene, ethylene glycol is produced.

I claim:

1. The process of producing glycols which comprises (1) oxidizing an olefinic compound to a glycol in an aqueous acidic medium comprising a source of catalytically active osmium tetraoxide, (2) chemically regenerating osmium tetraoxide by oxidizing hexavalent osmium with hexavalent chromium and (3) electrochemically regenerating hexavalent chromium from lower valent chromium.

2. The process of claim 1, wherein the oxidation of said olefinic compound is in an electrochemical cell.

3. The process of claim 2, wherein the anode is a source of hexavalent chromium.

4. The process of claim 2, wherein said electrochemical cell contains an organic acid capable of forming a peracid.

5. The process of claim 4, wherein said organic acid comprises at least one member selected from the group consisting of acetic acid, trichloroacetic acid and trifluoroacetic acid.

6. The process of claim 2, wherein said electrochemical cell contains a divider.

7. The process of claim 2, wherein the olefinic compound contains 2 to 4 carbon atoms.

8. The process of claim 2, wherein the olefinic compound comprises propylene.

9. The process of claim 2, wherein the olefinic compound comprises ethylene.

10. The process of claim 1, wherein a chromium salt is a source of hexavalent chromium.

11. The process of claim 4, wherein the anode is lead.

* * * * *